US008463535B2

(12) United States Patent
Torres et al.

(10) Patent No.: US 8,463,535 B2
(45) Date of Patent: Jun. 11, 2013

(54) METHOD AND APPARATUS FOR ENCODING AND USING USER PREFERENCES IN AIR TRAFFIC MANAGEMENT OPERATIONS

(75) Inventors: Sergio Torres, Bethesda, MD (US); Joel Klooster, Grand Rapids, MI (US); Mauricio Castillo-effen, Rexford, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 171 days.

(21) Appl. No.: 13/112,685

(22) Filed: May 20, 2011

(65) Prior Publication Data

US 2012/0191331 A1 Jul. 26, 2012

Related U.S. Application Data

(60) Provisional application No. 61/434,838, filed on Jan. 21, 2011.

(51) Int. Cl.

| | |
|---|---|
| ***G06F 19/00*** | (2011.01) |
| ***G06G 7/70*** | (2006.01) |
| ***G06G 7/76*** | (2006.01) |

(52) U.S. Cl.
USPC .......................................................... 701/120

(58) Field of Classification Search
USPC .......................... 701/122, 120; 340/951, 933
See application file for complete search history.

(56) References Cited

U.S. PATENT DOCUMENTS

| | | | | |
|---|---|---|---|---|
| 5,121,325 | A * | 6/1992 | DeJonge | 701/123 |
| 6,606,553 | B2 * | 8/2003 | Zobell et al. | 701/120 |
| 7,706,945 | B2 * | 4/2010 | Deng et al. | 701/41 |
| 2011/0295501 | A1 * | 12/2011 | Gutierez-Castaneda et al. | 701/206 |
| 2012/0191331 | A1 * | 7/2012 | Torres et al. | 701/120 |
| 2012/0209459 | A1 * | 8/2012 | Klooster | 701/18 |
| 2012/0215433 | A1 * | 8/2012 | Subbu et al. | 701/120 |
| 2012/0215435 | A1 * | 8/2012 | Subbu et al. | 701/120 |
| 2012/0245834 | A1 * | 9/2012 | Klooster et al. | 701/120 |

* cited by examiner

*Primary Examiner* — Mary Cheung
*Assistant Examiner* — Frederick Brushaber
(74) *Attorney, Agent, or Firm* — Ronald E. Prass, Jr.; Prass LLP

(57) ABSTRACT

A method and apparatus for encoding and using user preferences in air traffic management operations are disclosed. The method may include determining a current trajectory based on the user preferences, computing a cost of deviations from the current trajectory, codifying the cost of deviations from the current trajectory using normalized cost coefficients for one or more segments of the current trajectory, and communicating the codified cost of deviations to an air traffic control (ATC) automation system, wherein the ATC automation system computes costs of maneuvers based on the codified cost of deviations and ranks the maneuvers according to cost.

29 Claims, 3 Drawing Sheets

METHOD AND APPARATUS FOR ENCODING AND USING USER PREFERENCES IN AIR TRAFFIC MANAGEMENT OPERATIONS

PRIORITY INFORMATION

This application claims priority from U.S. Provisional Patent Application Ser. No. 61/434,838, filed Jan. 21, 2011, the content of which is incorporated herein by reference in its entirety.

BACKGROUND

1. Field of the Disclosed Embodiments

The disclosure relates to air traffic management.

2. Introduction

The cost of operating a flight may be decomposed into the cost of the fuel used and other direct and time-related costs, such as crew pay and aircraft maintenance costs. In advanced flight management systems (FMS) the Cost Index (CI) is a parameter that embodies the relative cost of fuel and the other direct and time-related costs; this parameter is used by the FMS to build the business reference trajectory according to operator preferences. The CI is often considered proprietary information by airlines as it embodies important strategic information related to the airline operational costs. Moreover, the specific relationship between cost index and airspeed varies from aircraft type to aircraft type and is a function of many variables such as gross weight, wind, temperature, altitude, and other factors, such as actual engine performance (for example, the actual fuel flow of an aircraft engine changes significantly over its lifetime).

On the other hand, to maintain safety and separation between aircraft, air traffic controllers and managers have to adjust flights with tactical and strategic changes, and the lack of knowledge of the user preferences that apply to each individual flight means that no effort is (or can be) made to reduce or minimize the costs of these changes to the operator. While exerting changes to the flight the controller has available several degrees of freedom (DOF) to direct those changes, including horizontally (such as lateral offsets or "direct-to" instructions to go straight to a down-route waypoint), vertically (such as altitude changes, either up or down), or temporally (via Required Time of Arrival, or more traditionally speed changes). However in many situations it is difficult or even impossible to determine which of the possible DOFs (or combination thereof) results in the minimal deviation from the reference business trajectory, or user preferences.

In principle, if the controller had access to the user preferences embodied in the CI information, he or she could take that information into account when deciding which of the available DOFs to exercise when a flight maneuver is required. In practice, however, CI is not available to the controller and even if a mechanism to provide CI information was available, airlines are reluctant to disclose it. Moreover, the mechanism to translate CI to the impact on operating cost of different types of maneuvers may be proprietary to the aircraft Original Equipment Manufacturer (OEM), and may not be able to be used by controllers or decision support tools (DST) directly. In trajectory based operations (TBO), user preferences are the driving force behind operations, where all operations should be based on trajectories that reflect operator business objectives. Thus, a method is needed for airlines to express their business preferences that is effective (i.e. it can be readily used by ground automation), is universally understood (i.e. it does not rely on operator or OEM unique translation), and that does not reveal strategic or proprietary information about the operator.

SUMMARY OF THE DISCLOSED EMBODIMENTS

A method and apparatus for encoding and using user preferences in air traffic management operations are disclosed. The method may include determining a current trajectory based on the user preferences, computing a cost of deviations from the current trajectory, codifying the cost of deviations from the current trajectory using normalized cost coefficients for one or more segments of the current trajectory, and communicating the codified cost of deviations to an air traffic control (ATC) automation system, wherein the ATC automation system computes costs of maneuvers based on the codified cost of deviations and ranks the maneuvers according to cost.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSED EMBODIMENTS

Figure 1:
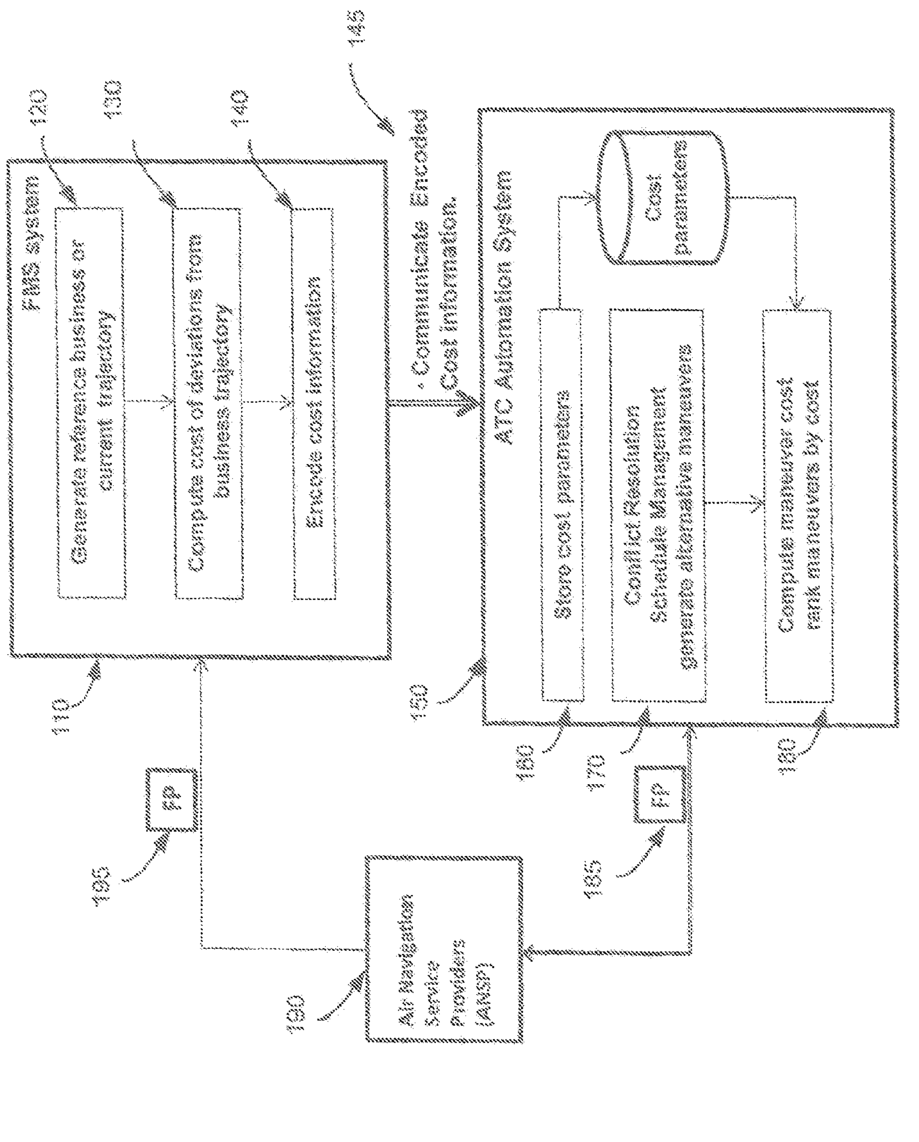
FIG. 1 is a diagram of an exemplary method to encode and use user preferences in air traffic management operations in accordance with a possible embodiment of the disclosure.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Aspects of the embodiments disclosed herein relate to a method for encoding and using user preferences in air traffic management operations, as well as corresponding apparatus and computer-readable medium.

The disclosed embodiments may include a method for encoding and using user preferences in air traffic management operations. The method may include determining a current trajectory based on the user preferences, computing a cost of deviations from the current trajectory, codifying the cost of deviations from the current trajectory using normalized cost coefficients for one or more segments of the current trajectory, and communicating the codified cost of deviations to an air traffic control (ATC) automation system, wherein the ATC automation system computes costs of maneuvers based on the codified cost of deviations and ranks the maneuvers according to cost.

The disclosed embodiments may include an apparatus for encoding and using user preferences in air traffic management operations. The apparatus may include an automation system operable in a trajectory based air traffic management (ATM) environment that determines a current trajectory based on the user preferences, computes a cost of deviations from the current trajectory, codifies the cost of deviations from the current trajectory by using normalized cost coefficients for one or more segments of the current trajectory, and a communication interface to communicate the codified cost of deviations to an air traffic control (ATC) ground automation system, wherein the ATC ground automation system computes costs of maneuvers based on the communicated codified cost of deviations and ranks the maneuvers according to cost.

The disclosed embodiments may include a non-transient computer-readable medium storing instructions for encoding and using user preferences in air traffic management operations, the instructions comprising determining a current trajectory based on the user preferences, computing a cost of deviations from the current trajectory, codifying the cost of deviations from the current trajectory using normalized cost coefficients for one or more segments of the current trajectory, and communicating the codified cost of deviations to an air traffic control (ATC) automation system, wherein the ATC automation system computes costs of maneuvers based on the codified cost of deviations and ranks the maneuvers according to cost.

FIG. 1 provides a diagram of an exemplary method and apparatus to encode and use user preferences in air traffic management operations in accordance with a possible embodiment of the disclosure. The disclosed embodiments may concern allowing aircraft operators to communicate user preferences to ground Air Navigation Service Providers (ANSP) in an efficient manner that may not reveal proprietary information. The disclosed embodiments may also allow ANSPs to take into account user preferences in Air Traffic Management (ATM) operations by using encoded user preferences to make decisions and to modify aircraft flight path and trajectories in a way that minimizes the deviation from the stated user preferences. User intentions and ANSP directions and authorizations may be embodied in flight plans 185 and 195.

The disclosed embodiments may also concern a mechanism to express operator business preferences specific to each flight that addresses operator proprietary concerns, usability of the information by ground automation systems, and facilitates exchange of this information between different air traffic management systems. In addition to the generation and encoding of user preferences, the disclosed embodiments may include a method to use the encoded information in ATM systems so that the cost of alternative maneuvers (i.e., strategic changes to the flight plan for conflict resolution or schedule management) can be assessed and therefore a cost optimal decision can be made by ATM systems. Embodiments of the disclosure provide the exchange between an aircraft flight management system (FMS) 110 and an air traffic control (ATC) automation system 150; however, this process theoretically applies to any two automation systems in a trajectory based ATM environment.

The disclosed embodiments may solve the problem by generating a reference business trajectory (which also may be referred to herein as a current trajectory) 120, computing a cost of deviations from the business (or current) trajectory 130 and codifying the cost of deviations 140, or cost information, from the current trajectory in at least one of the three degrees of freedom (DOF)—lateral, altitude and time/speed—by using normalized cost coefficients for one or more segments of the trajectory. Details are provided below, but a simplified example may help clarify the concept.

Embodiments of the present disclosure provide that the aircraft may be equipped with a flight management system (FMS) 110 or FMS software running in a ground station for an unmanned vehicle. An airline will file a flight plan with the ANSP, and the ANSP 190 may provide the flight plan (FP) 185 to ATC automation system 150. The ANSP may then clear the flight plan 195 to FMS 110. The FMS may be capable of generating the optimal trajectory 120 based on a cost index (CI) provided by a dispatcher. The flight plan known by the ANSP may not (in fact, it likely will not) include this CI information. It may also be assumed that such optimal trajectory (also referred to herein as a "business trajectory" or "current trajectory") may be sent via a communication interface, for example via an Automatic Dependent Surveillance-Contract (ADS-C) downlink, to air traffic control (ATC) automation system 150, which may store the cost parameters 160 and integrate alternative maneuvers generated based on conflict resolution and schedule management 170 and compute a cost of maneuvers based on the codified cost of deviations and rank the maneuvers according to cost 180. This may be made available to the Air Navigation Service Providers (ANSPs) 190.

At the time of building the business trajectory, or via some background process, the FMS 110 may compute for each relevant trajectory segment, and using the applicable CI information, the differential cost (in fuel and other time-related operating costs) of flying the same segment at different altitudes (for example, 1000 feet above and 1000 feet below the current or modeled altitude), and at different speeds (for example 20 knots faster and 20 knots slower than the current or modeled speed), and assuming a longer or shorter distance at the modeled altitude (for instance 5 nautical mile (nm) longer and 5 nm shorter than the modeled segment length). The results of the FMS 110 cost differential computations for "deltas" of ±1000 feet in altitude ±20 knots in speed and ±5 nm in length may now be included as part of four dimensional (4D) FMS trajectory information in the form of normalized coefficients as described in more detail below.

Ground automation 150 may now apply these normalized cost coefficients to minimize the cost of maneuvering the aircraft around conflicts and restrictions that interfere with the current trajectory. This enables a ground controller (with the aid of DSTs) to make an informed decision that may increase the likelihood that operations reflect business objectives and may allow airlines to influence decisions such that the impact on the business objectives are minimized when changes are required.

There may be several ways in which the above mentioned cost information can be computed, encoded and used by ground automation 150. Embodiments of the disclosure provide that the cost information is normalized to an easily and universally understood value (such as a unit-less parameter, percent of cost change relative to the optimal, or a monetary value). Although not limited in this respect, the following steps may describe one possible embodiment of normalizing cost information to an easily and universally understood value:

(a) The "user preferred trajectory" or "reference business trajectory" or "current trajectory" (used interchangeably herein) may be provided from one trajectory predictor (potentially the FMS on board the aircraft or the FMS software running in a ground station for an unmanned vehicle) to a decision support tool. Ideally this 4D trajectory represents operator preferences in regards to balancing the cost of time relative to the cost of fuel for the flight (although it should be recognized that this may not be the case if previous ATC actions have already caused the aircraft to deviate from its reference business trajectory).

(b) The same trajectory predictor that generated the optimal 4D trajectory solution in step (a) may compute the costs (for example dollars per mile, dollars per minute, etc.) associated with one or more of the following changes to the optimal trajectory along one or more segments of that trajectory:

- increasing the target altitude from the initial modeling point (or current position) to a specified end point (prior to or equal to the destination airport) with identical 2D (lateral) routing but above the current target altitude for that segment;
- decreasing the target altitude from the initial modeling point (or current position) to a specified end point (prior to or equal to the destination airport) with identical 2D (lateral) routing but below the current target altitude for that segment;
- increasing the target speed (either by an increase of the cost index or some other speed target parameter) from the initial modeling point (or current position) to a specified end point (prior to or equal to the destination airport) with identical 2D (lateral) routing but faster than the current target speed for that segment;
- decreasing the target speed (either by an decrease of the cost index or some other speed target parameter) from the initial modeling point (or current position) to a specified end point (prior to or equal to the destination airport) with identical 2D (lateral) routing but slower than the current target speed for that segment;
- increasing the lateral path length (2D path) from the initial modeling point (or current position) to a specified end point (prior to or equal to the destination airport) at the current target speed and altitude on that segment (to reflect insertion of delay maneuvers such as path stretch, vectoring or holding patterns);
- decreasing the lateral path length (2D path) from the initial modeling point (or current position) to a specified end point (prior to or equal to the destination airport), if possible (for instance cutting a corner or with a "direct-to" path to a downstream route point), at the current target speed and altitude on that segment (It is noted that it may not be possible to decrease the path length if the current trajectory already represents the shortest path).

The cost computations described above may be repeated for a series of target altitudes and/or speeds so as to cover a region in DOF space sufficient to support the expected maneuvers under normal ATM operations and aircraft envelope.

The cost associated with the last two modifications (increasing or decreasing the lateral path length while maintaining the current speed and altitude) may also be easily computed by a separate decision support tool. For example, if the cost of the reference trajectory segment is provided as X (where the units of X are for example, lbs/min, lbs/nm, $/min or $/nm), the cost of increasing the path length by Y (where the units of Y are the same as the denominator of the units of X, in this case min or nm), the cost of this deviation may simply be X*Y.

It should also be noted that the cost may be negative, representing a cost savings rather than a cost penalty, if the reference trajectory is not the purely optimal trajectory (which may be the case if the trajectory must be routed over fixed ground-based navigation aids, as is the case in current operations).

In the example given, the modeling environment may assume that the flight is in cruise, and the current state of the aircraft provides the initial location of the modeled 4D trajectory. The use of cost parameters is envisioned to provide benefit during the cruise and descent phases of flight. Also, the altitude or speed "deltas" or the lateral path deviation may be assumed to take effect from the initial position forward (i.e. there may be no "return" maneuver modeled after the "delta" is applied).

(c) For each of the one or more relevant segments of the reference trajectory from step (a), the cost parameters may be normalized for one or more trajectory deviations from step b) such that the cost may be unambiguous. One method of normalizing the cost may be to reference the current trajectory to 0 and express the cost as a percentage increase (positive) or decrease (negative) cost relative to the current trajectory. Alternatively, the time cost may be provided relative to distance (lbs per nm) or time (lbs per min). This allows both time and fuel costs to be taken into account without revealing the actual cost of fuel or time-based operating costs, which may be considered business sensitive or competitive data by the operator.

(d) These normalized costs may be exchanged between disparate systems in a way that is easily and unambiguously understood. Although not limited to these methods, embodiments of the disclosure provide the cost function may be a two-dimensional (2D) function (cost as a function of speed and altitude) that may be represented using one of the following methods depending on the desired level of fidelity:

- The costs may be encoded as a set of coefficients of nth-order polynomials of one variable where the cost may be a function of the deviation from the reference trajectory along one DOF. For example, to compute the coefficients {c0, c1, c2} of a 2nd order polynomial expansion that allows expressing the cost (for this segment) as a function of deviation from reference in a dimension x as follows: cost(x)=c0+c1*x+c2*x*x, where x may be one of: delta altitude, delta speed, or delta path length (for example, using a lateral offset which is assumed to be left/right symmetric); For a 2nd order (n=2) polynomial approximation there may be 3 coefficients {c0, c1, c2} for each DOF that is represented. Given multiple computed costs from step b), published closed-form (i.e. non-iterative) algebraic methods could be used to compute the coefficients of a polynomial of order n=2 or smaller. The polynomials described for this option may represent the cost of a change along one dimension while the other two are held fixed (for instance changing altitude but keeping velocity and distance unchanged);
- A more useful representation that may allow computing costs for deviations in more than one DOF simultaneously is to use the coefficients of a multi-variable polynomial. For example, the costs of deviating from the reference trajectory in both the speed (v) and altitude (z) DOFs may be represented as the 6 coefficients of a 2nd order polynomial function of two variables: cost(v,z)=c0+c1*v+c2*z+c3*v*v+c4*z*z+c5*v*z;

Another alternative that may also allow computation of costs for combinations of maneuvers in velocity and altitude is to provide "curves of constant altitude" in a polynomial representation. For a 2nd order polynomial these curves are of the form: cost (v;z)=c0+c1*v+c2*v*v, where v is the delta in speed, and z is the altitude (there is one such polynomial for each altitude level). This representation may have more freedom to adjust 2D cost curves that do not fit well to the 2D polynomial described in the previous option. It is noted that the coefficient c0 encodes the cost of initiating the change (i.e. making the change in altitude from one level to the other) and the other coefficients encode the cost of maintaining the new state (continuing the flight at the new altitude). If the cost cannot be adequately represented as polynomial function (either in the first option of the "curves of constant altitude" option), it may be approximated as a piecewise linear function within specified bounds of the independent variable(s).

Normalized cost curves may be generated for a range of true airspeeds, with potentially separate curves for separate altitudes at which an aircraft may be flown. With cost index 100, and the weighting of fuel cost to time-based cost being, for example, approximately 55% fuel, 45% time.

Curves may show the relative cost that take into account a given CI for an aircraft operating at various altitudes and speeds around a nominal starting operating point. The representation of the cost curves using a piecewise linear segmentation of the curves may be used for various altitudes. The breakpoints between segments may be inserted based on a tolerance, or maximum deviation of the linear approximation from the original curve, for example. An algorithm to accomplish this segmentation may be the "sample and prune" algorithm: sample the original curve at points of equal step size along the abscissa then traverse the curve along the inserted points and remove ("prune") all those points that deviate less than the tolerance parameter from the linear interpolation joining the previous non-removed point with the point next in order of traversal.

A quadratic and cubic polynomial representation of the relative cost curves may also be used. The polynomials may be obtained (depending on computational power and accuracy constraints) by performing a least-squares fit to the relative cost curves or using closed algebraic expressions (possible for n less or equal to 3) of the polynomial coefficients in terms of the coordinates of sampled points along the curves.

(e) The ground system 150 may use the cost information to compute the cost differential (on a segment by segment basis) that may be incurred when amending the flight plan with a change in speed or altitude or lateral path or combination thereof. This computation may be readily achieved simply by computing for each segment the additional cost using the cost parameters, the magnitude of the deviation and the duration of the flight. The relative cost of each possible amendment may be thus obtained and the most cost effective solution may be selected. These maneuvers may be for conflict resolution, schedule management, or resolution of flow constraints.

The following example illustrates the method of cost computation using the "curves of constant altitude" approach described above for encoding the cost of deviations from the current trajectory. The cost computation for a conflict resolution may proceed as follows (to simplify the example it is assumed that two simple maneuvers are going to be tried for solving a conflict, the addition of alternative maneuvers is handled in a similar manner as the two maneuvers in the example). It may be assumed that a conflict is predicted to occur within the strategic time frame (so that the conflict is not imminent) and that the flight plan trial function returns two proposed alternatives to resolve the conflict: M1=increase altitude 1000 feet and increase speed by 20 knots, and M2=decrease altitude by 1000 feet and decrease speed by 25 knots (note that both M1 and M2 involve 2 DOFs each, i.e. the maneuvers are along 2 separate dimensions). The costs may be computed for each maneuver separately using the "curves of constant altitude" approach:

$$MC1=L*\text{cost}(+20;\ z0+1000)=L*(c0+c1*20+c2*20*20)$$

$$MC2=L*\text{cost}(-25;\ z0-1000)=L*(c3-c4*25+c5*25*25)$$

where, MC1 may be the relative cost of changing the flight according to the maneuver M1, MC2 may be the relative cost of changing the flight according to the maneuver M2, L may be the length of the flight affected by the maneuver, the coefficients {c0,c1,c2} may be the polynomial coefficients (2nd order) for the "curve of constant altitude" corresponding to an altitude of 1000 feet above the reference altitude (z0), the coefficients {c3,c4,c5} may be the polynomial coefficients (2nd order) for the "curve of constant altitude" corresponding to an altitude of 1000 feet below the reference altitude(z0).

The two maneuvers may now be ranked according to cost, in order:

M1, M2 if MC1<MC2

M2, M1 if MC2<MC1

Ranked maneuvers (advisories) may be presented in rank order to the controller, or the maneuver of highest rank is selected for execution according to the procedures that apply.

In the steps above, the assumption is made that the "delta" (in speed, altitude or lateral offset) may be an amendment to flight plans 185, 195 that takes effect from the initial modeling point (or current position) to a specified end point (prior to or equal to the destination airport), therefore there is no need to specify a return to route maneuver. The end result of the operations described above may be that with the availability of the cost information the ground automation may generate an advisory that minimizes deviations from the business reference trajectory.

The FMS trajectory (down-linked to ANSPs at 145) may be augmented by including normalized cost coefficients that translate the airline Cost Index into the relative cost of changes to the reference business trajectory. They may encode the relative cost per minute of flight of "deltas" in altitude, velocity and lateral movement.

Conflict resolution may make use of encoded cost information by enhancing the trial plan function to automatic generation of plan trials using 3 degrees of freedom: altitude, lateral, and speed and ranking conflict resolution options by cost (using FMS generated cost information).

Cost parameters may be applicable on a segment-by-segment basis (i.e. valid from the trajectory point specified to the next point that has a cost coefficient specified). If not provided, the ground system may use cost based on fuel burn only. Cost parameters may need to be computed only for relevant segments that cover cruise (for strategic conflict resolution) and the area between the freeze horizon and the metering fix (for schedule management) and may need to be computed only when down-linking the 4D trajectory to the ground. Embodiments of the disclosure provide that this could be computed by FMS software running on support tools on the ground.

The benefits of the disclosed embodiments may include:

- Efficient mechanism to express user preferences: less than 9 coefficients per relevant trajectory segment is often sufficient.
- Encompasses the cost of fuel as well as other time-dependant or direct operating costs not embodied in fuel burn.
- Drives ground automation systems (Conflict Detection & Resolution and schedule management) towards the operator optimal solution.
- Consistent with "best equipped, best served".
- Allows the aircraft operator (flight dispatch) to influence ATM operations
- Cost index can easily be translated to cost coefficients that are universally understandable and therefore can be used by any system.
- Resolves airline proprietary issues: Since the cost of deltas is expressed in terms of normalized cost differentials per DOF (only the relative weight is meaningful) the method mitigates proprietary issues (cost index is not revealed).
- Adaptable/extensible to desired level of fidelity.
- Does not need to be specified for the entire trajectory (only segments in strategic region).
- Linear or non-linear law can be specified as needed.
- System works with fuel-based default costs.
- Avoids time-consuming and expensive iteration of alternative trajectories between aircraft and ATC which may end up with no agreement.

Figure 2:
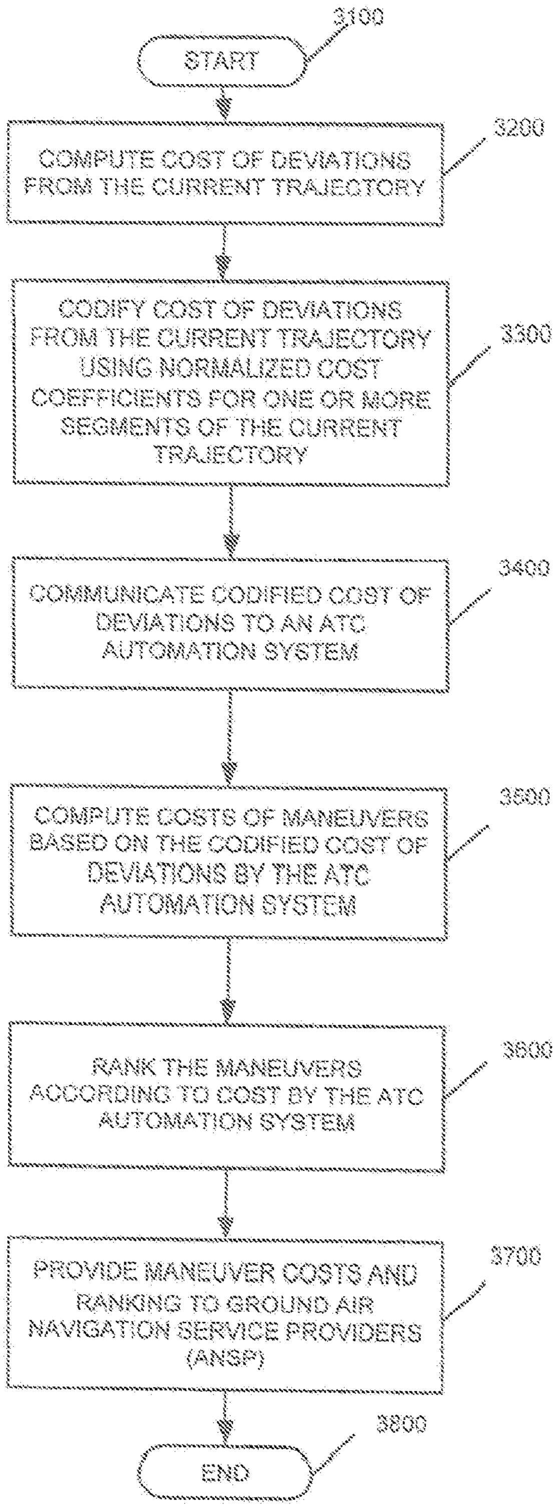
FIG. 2 is an exemplary flowchart illustrating a possible method to encode and use user preferences in air traffic management operations in accordance with one possible embodiment of the disclosure.

FIG. 2 is an exemplary flowchart illustrating a possible method to encode and use user preferences in air traffic management operations in accordance with one possible embodiment of the disclosure. The process may begin at step 3100 and may continue to step 3200 where a cost of deviations from the current trajectory are computed.

In step 3300, the cost of deviations is codified from the current trajectory using normalized cost coefficients for one or more segments of the current trajectory.

In step 3400, the codified cost of deviations are communicated to an air traffic control (ATC) automation system 150.

At step 3500, the ATC automation system 150 computes costs of potential allowable maneuvers based on the codified cost of deviations.

At step 3600, the ATC automation system 150 ranks the maneuvers according to cost.

At step 3700, the maneuver costs and ranking are provided to ground Air Navigation Service Providers (ANSP) 190 to enable the ANSP 190 to take into account the user preferences in ATM operations, such that the encoded user preferences are incorporated into decisions that modify aircraft flight paths and trajectories in a way that minimizes deviation from the user preferences. The process ends at 3800.

Figure 3:
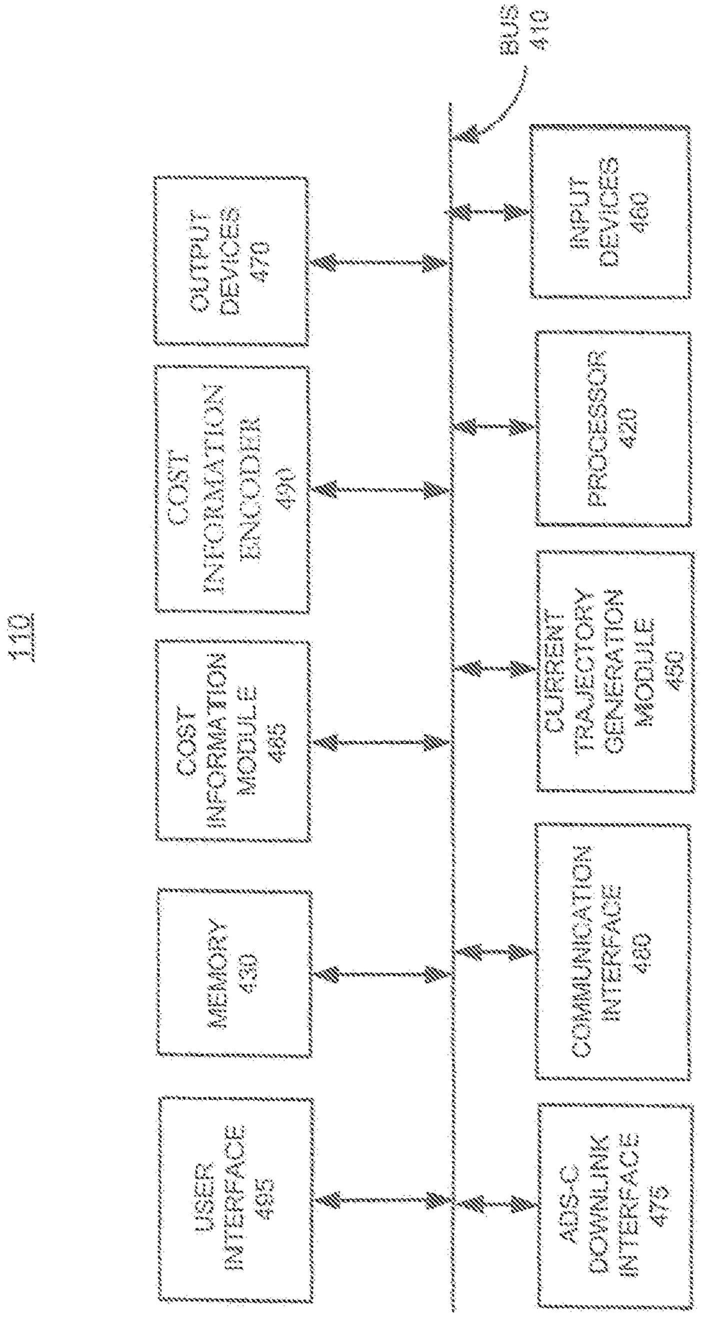
FIG. 3 is a block diagram of an FMS in accordance with a possible embodiment of the disclosure.

FIG. 3 is a block diagram of an exemplary flight management system (FMS) 110 in accordance with a possible embodiment of the disclosure. As stated above, the FMS may be a flight management system (FMS) on board an aircraft or FMS software running in a ground station for an unmanned vehicle. The FMS 110 may include bus 410, processor 420, memory 430, current trajectory generation module 450, input devices 460, output devices 470, communication interface 480, cost information reception and storage module 485, cost information encoder 490, ADS-C downlink interface 475, and user interface 495. Bus 410 may permit communication among the components of the FMS 110.

Processor 420 may include at least one conventional processor or microprocessor that interprets and executes instructions to accomplish the calculations and determinations set forth above. Memory 430 may be a random access memory (RAM) or another type of dynamic storage device that stores information and instructions for execution by processor 420. Memory 430 may also include a read-only memory (ROM) which may include a conventional ROM device or another type of static storage device that stores static information and instructions for processor 420.

Communication interface 480 may include any mechanism that facilitates communication via a network and may communicate with ADS-C downlink interface 475 for communicating the encoded cost information 140 to ATC automation system 150. Alternatively, communication interface 480 may include other mechanisms for assisting in communications with other devices and/or systems.

ROM may be included in memory 430 to include a conventional ROM device or another type of static storage device that stores static information and instructions for processor 420. A storage device may augment the ROM and may include any type of storage media, such as, for example, magnetic or optical recording media and its corresponding drive.

Input devices 460 may include one or more conventional mechanisms that permit a user to input information to the FMS 110, such as a keyboard, a mouse, a pen, a voice recognition device, touchpad, buttons, etc. Output devices 470 may include one or more conventional mechanisms that output information to the user, including a display, a printer, a copier, a scanner, a multi-function device, one or more speakers, or a medium, such as a memory, or a magnetic or optical disk and a corresponding disk drive.

The FMS 130 may perform such functions in response to processor 420 by executing sequences of instructions contained in a computer-readable medium, such as, for example, memory 430. Such instructions may be read into memory 430 from another computer-readable medium, such as a storage device or from a separate device via communication interface 480.

The FMS 110 illustrated in FIG. 1 and ATC automation system 150 and the related discussion were intended to provide a brief, general description of a suitable communication and processing environment in which the invention may be implemented. Although not required, embodiments of the disclosure provide, at least in part, in the general context of computer-executable instructions, such as program modules, being executed by the FMS 130, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the invention may be practiced in communication network environments with many types of communication equipment and computer system configurations, including personal computers, hand-held devices, multi-processor systems, microprocessor-based or programmable consumer electronics, and the like.

Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A method for encoding and using user preferences for an aircraft operator in air traffic management operations, comprising:

- determining a current trajectory for an aircraft based on the user preferences for the aircraft operator;
- computing, with a first processor, a cost of deviations from the current trajectory;
- codifying, with the first processor, the cost of deviations from the current trajectory using normalized cost coefficients for one or more segments of the current trajectory according to the user preferences for the aircraft operator; and
- communicating the codified cost of deviations from the first processor to a second processor in an air traffic control (ATC) automation system,
- wherein the second processor in the ATC automation system (1) computes costs of maneuvers based on the codified cost of deviations and (2) rank orders the maneuvers according to the computed costs of the maneuvers.

2. The method of claim 1, further comprising providing the computed costs of the maneuvers and the rank order to ground Air Navigation Service Providers (ANSP) to enable the ground ANSP to take into account the user preferences for the aircraft operator in air traffic management operations such that the user preferences for the aircraft operator are incorporated into automated decisions that modify aircraft flight paths and trajectories in a way that minimize deviations from the user preferences for the aircraft operator.

3. The method of claim 1, wherein the codifying the cost of deviations from the current trajectory uses at least one of three degrees of freedom, the three degrees of freedom including lateral flight path deviations, altitude changes, and airspeed changes.

4. The method of claim 3, wherein the cost of deviations computations are repeated for at least one of a series of target altitudes and a series of target airspeeds to cover a region in a degrees of freedom space sufficient to support expected maneuvers under normal air traffic management operations.

5. The method of claim 4, wherein the cost of deviations associated with increasing or decreasing a lateral flight path deviations path length while maintaining a current speed and altitude is computed by a separate decision support tool.

6. The method of claim 1, wherein the normalized cost coefficients for the one or more segments of the current trajectory reference the current trajectory to 0 and express the cost of deviations as a percentage increase or decrease cost relative to the current trajectory.

7. The method of claim 6, wherein the normalized cost coefficients are exchanged between disparate systems by using a 2D cost function including cost as a function of speed and altitude that are represented using one or more of the following encoding methods:

- encoding costs as a set of coefficients of nth-order polynomials of one variable, where the cost may be a function of the deviation from a reference trajectory along one of the three degrees of freedom;
- encoding costs using the coefficients of a multi-variable polynomial to allow computing costs for deviations in more than one of the three degrees of freedom simultaneously;
- encoding costs by providing curves of constant altitude in a polynomial representation that allow computation of costs for combinations of maneuvers in velocity and altitude; or
- encoding costs using a quadratic or cubic polynomial representation of relative cost curves.

8. The method of claim 1, wherein the first processor is in a flight management system (FMS) on board an aircraft or a function of an FMS software running in a ground station for an unmanned vehicle.

9. The method of claim 1, wherein the current trajectory is an optimal trajectory based on a cost index (CI) established by the aircraft operator.

10. The method of claim 1, wherein the communicating the codified the cost of deviations from the first processor to the second processor is accomplished via an ADS-C downlink.

11. An apparatus for encoding and using user preferences for an aircraft operator in air traffic management operations, comprising:

- an automation system operable in a trajectory based air traffic management environment that:
  - determines a current trajectory for an aircraft based on the user preferences for the aircraft operator;
  - computes a cost of deviations from the current trajectory;
  - codifies the cost of deviations from the current trajectory by using normalized cost coefficients for one or more segments of the current trajectory according to the user preferences for the aircraft operator; and a communication interface to communicate the codified cost of deviations from the automation system to a separate air traffic control (ATC) ground automation system, wherein the separate ATC ground automation system (1) computes costs of maneuvers based on the communicated codified cost of deviations and (2) rank orders the maneuvers according to the computed costs of the maneuvers.

12. The apparatus of claim 11, wherein the automation system is a flight management system (FMS) on board an aircraft or FMS software running in a ground station for an unmanned vehicle.

13. The apparatus of claim 11, wherein the computed costs of the maneuvers and the rank order are provided to ground Air Navigation Service Providers (ANSP) to enable the ground ANSP to take into account the user preferences for the aircraft operator in air traffic management operations such that the user preferences for the aircraft operator are incorporated into automated decisions that modify aircraft flight paths and trajectories in a way that minimize deviations from the user preferences for the aircraft operator.

14. The apparatus of claim 11, wherein the codifying the cost of deviations from the current trajectory uses at least one of three degrees of freedom, the three degrees of freedom including lateral flight path deviations, altitude changes, and airspeed changes.

15. The apparatus of claim 11, wherein the normalized cost coefficients for the one or more segments of the current trajectory reference the current trajectory to 0 and express the cost of deviations as one of a percentage increase or decrease cost relative to the current trajectory, and a non-monetary unit related to a rate of fuel consumption.

16. The apparatus of claim 15, wherein the normalized cost coefficients are exchanged between disparate systems by using a 2D cost function including cost as a function of speed and altitude that are represented using one or more of the following encoding methods:

encoding costs as a set of coefficients of nth-order polynomials of one variable, where the cost may be a function of the deviation from a reference trajectory along one of the three degrees of freedom;

encoding costs using the coefficients of a multi-variable polynomial to allow computing costs for deviations in more than one of the three degrees of freedom simultaneously;

encoding costs by providing curves of constant altitude in a polynomial representation that allow computation of costs for combinations of maneuvers in velocity and altitude; or encoding costs using a quadratic or cubic polynomial representation of relative cost curves.

17. The apparatus of claim 11, wherein the current trajectory is an optimal trajectory based on a cost index (CI) established by the aircraft operator.

18. The apparatus of claim 11, wherein the communication interface includes an ADS-C downlink.

19. The apparatus of claim 11, wherein the cost of deviations computations are repeated for at least one of (1) a series of target altitudes and a series of target airspeeds to cover a region in a degree of freedom space sufficient to support expected maneuvers under normal air traffic management operations.

20. The apparatus of claim 19, wherein the cost of deviations associated with increasing or decreasing a lateral flight path deviations path length while maintaining a current speed and altitude is computed by a separate decision support tool.

21. A non-transient computer-readable medium storing instructions that, when executed by a first processor, cause the first processor to execute a method for encoding and using user preferences of an aircraft operator in air traffic management operations, the method comprising:

determining a current trajectory based on the user preferences of the aircraft operator;

computing a cost of deviations from the current trajectory;

codifying the cost of deviations from the current trajectory using normalized cost coefficients for one or more segments of the current trajectory according to the user preferences for the aircraft operator; and communicating the codified cost of deviations to an air traffic control (ATC) automation system, wherein a second processor in the ATC automation system (1) computes costs of maneuvers based on the codified cost of deviations and (2) rank orders the maneuvers according to the computed costs of maneuvers.

22. The non-transient computer-readable medium of claim 21, the method further comprising:

providing the computed costs of the maneuvers and the rank order to ground Air Navigation Service Providers (ANSP) to enable the ground ANSP to take into account the user preferences for the aircraft operator in air traffic management operations such that the user preferences for the aircraft operator are incorporated into automated decisions that modify aircraft flight paths and trajectories in a way that minimize deviations from the user preferences for the aircraft operator.

23. The non-transient computer-readable medium of claim 21, wherein the codifying the cost of deviations from the current trajectory uses at least one of three degrees of freedom, the three degrees of freedom including lateral flight path deviations, altitude changes, and airspeed changes.

24. The non-transient computer-readable medium of claim 23, wherein the cost of deviations computations are repeated for at least one of a series of target altitudes and a series of target airspeeds to cover a region in a degree of freedom space sufficient to support expected maneuvers under normal air traffic management operations.

25. The non-transient computer-readable medium of claim 24, wherein the cost of deviations associated with increasing or decreasing a lateral flight path deviations path length while maintaining a current speed and altitude is computed by a separate decision support tool.

26. The non-transient computer-readable medium of claim 21, wherein the normalized cost coefficients for the one or more segments of the current trajectory references the current trajectory to 0 and express the cost of deviations as one of a percentage increase or decrease cost relative to the current trajectory, and a non-monetary unit related to a rate of fuel consumption.

27. The non-transient computer-readable medium of claim 26, wherein the normalized cost coefficients are exchanged between disparate systems by using a 2D cost function including cost as a function of speed and altitude that are represented using one or more of the following encoding methods:

encoding costs as a set of coefficients of nth-order polynomials of one variable, where the cost may be a function of the deviation from a reference trajectory along one of the three degrees of freedom;

encoding costs using the coefficients of a multi-variable polynomial to allow computing costs for deviations in more than one of the degrees of freedom simultaneously;

encoding costs by providing curves of constant altitude in a polynomial representation that allow computation of costs for combinations of maneuvers in velocity and altitude; or encoding costs using a quadratic and cubic polynomial representation of relative cost curves.

28. The non-transient computer-readable medium of claim 21, wherein the current trajectory is an optimal trajectory based on a cost index (CI) established by the aircraft operator.

29. The non-transient computer-readable medium of claim 21, wherein the communicating the codified cost of from the first processor to the second processor is accomplished via an ADS-C downlink.

* * * * *